March 19, 1946.    J. R. SCHIETINGER    2,397,052
SOLDERING APPARATUS
Filed Sept. 2, 1943    2 Sheets-Sheet 2

INVENTOR
J. R. SCHIETINGER
BY
ATTORNEY

Patented Mar. 19, 1946

2,397,052

UNITED STATES PATENT OFFICE 2,397,052

SOLDERING APPARATUS

James R. Schietinger, Baltimore, Md., assignor to Western Electric Company, Incorporated, New York, N. Y., a corporation of New York Application September 2, 1943, Serial No. 500,909

3 Claims. (Cl. 219—12)

This invention relates to soldering apparatus, and has for its object the provision of new and improved soldering apparatus.

In soldering terminals to the large gauge conductors of heavy cables, it is very difficult to hold the heavy cables and the terminals without relative movement therebetween while the solder connecting the terminals to the conductors solidifies. Unless such relative movement therebetween is eliminated, joints having imperfect electrical conductivity and mechanical strength may be formed and the terminals may be displaced with respect to the conductors to which they are soldered. Heretofore, it has been difficult to solder the terminals to the cables without making imperfect joints therebetween.

Commercially satisfactory soldered joints may be made between terminals and cables by employing a fixture embodying the invention, which comprises a plurality of sockets for holding terminals to be attached to a cable, means for securing the end of a cable so that the conductors therein engage the terminals, pairs of individually movable carbon electrodes designed to selectively engage the terminals to heat them, and a manually operated switch for controlling the energization of the electrodes.

Other objects and advantages of the invention will become apparent from the following detailed description, when read in conjunction with the drawings, in which.

Figure 1:
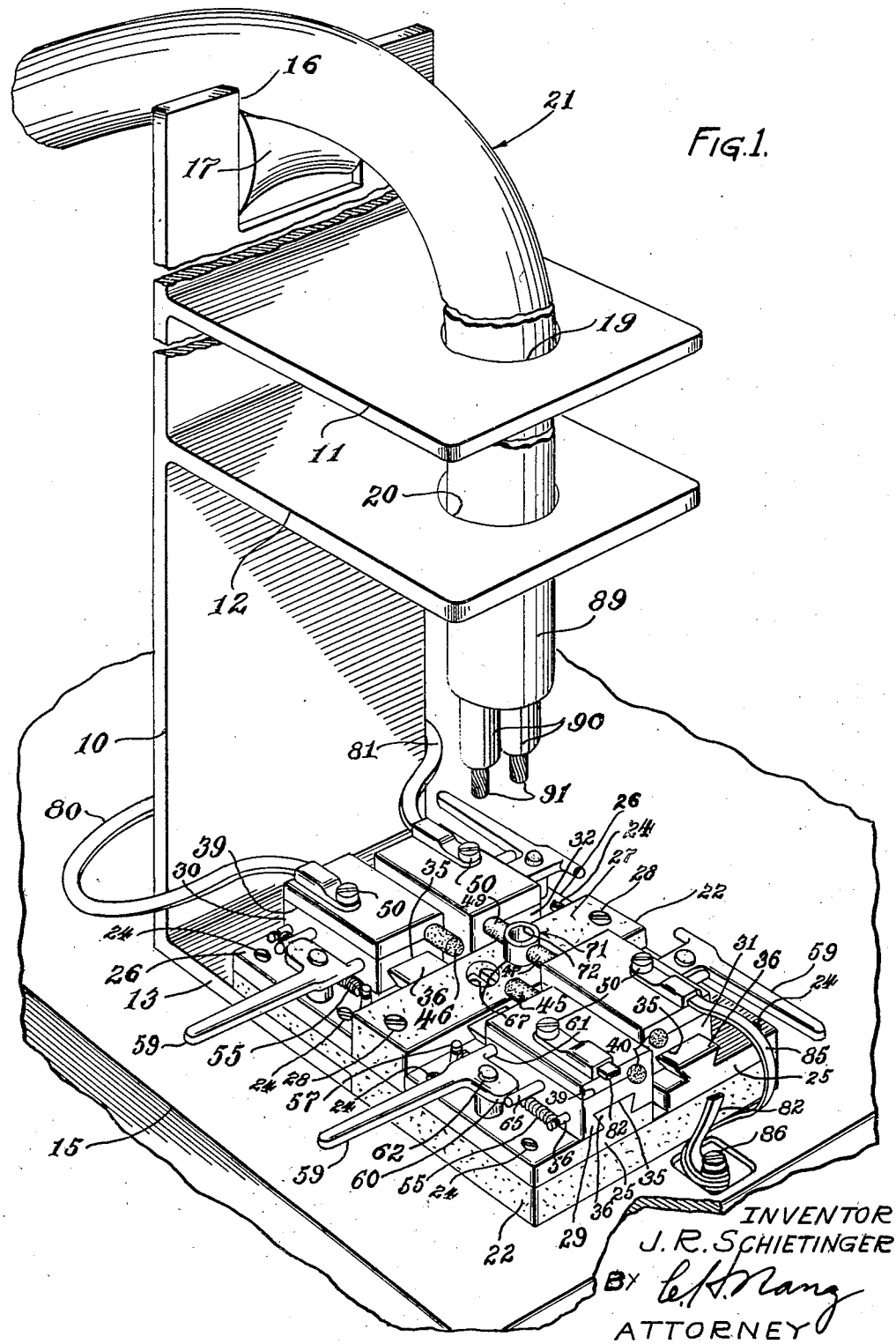
Fig. 1 is a perspective view of a fixture embodying the invention.
Figure 2:
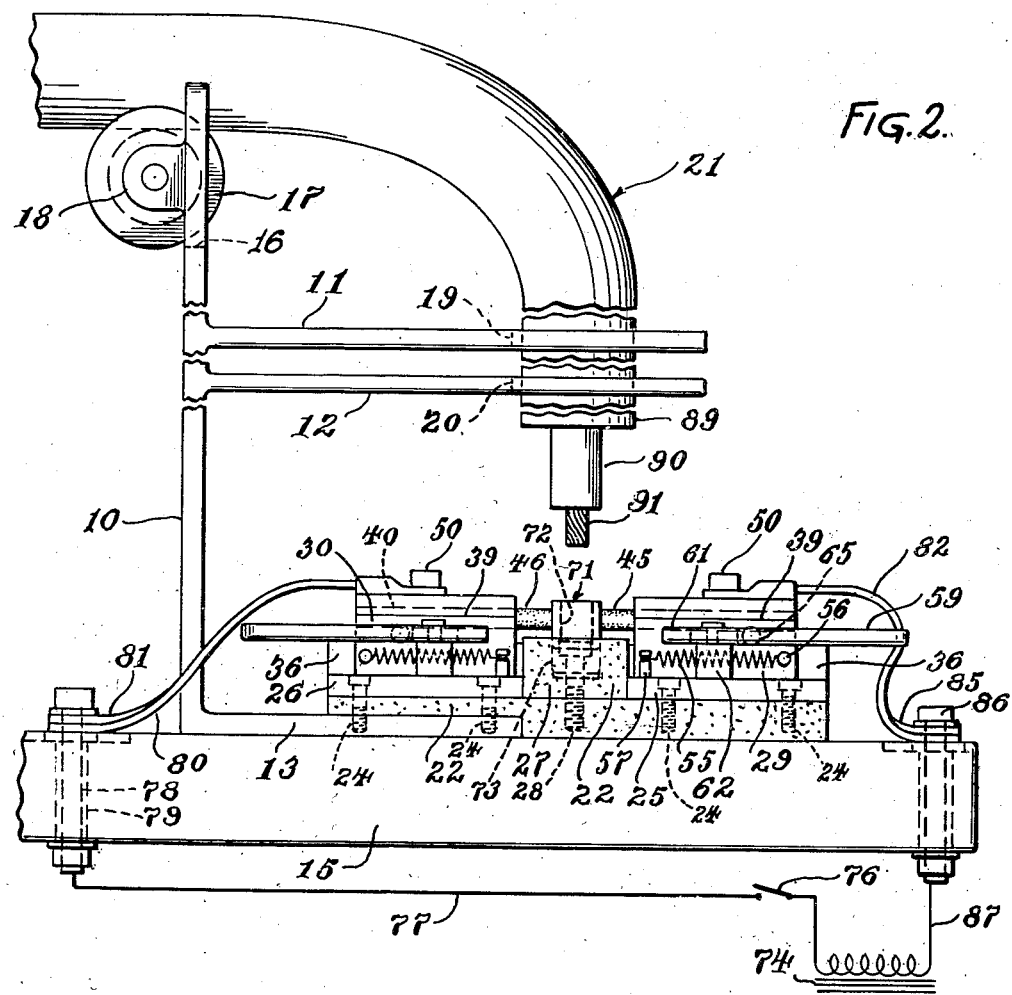
Fig. 2 is a side elevational view of the fixture.

Referring now to the drawings, an L-shaped support 10 (Fig. 1) having horizontal guides 11 and 12 and a base member 13 formed thereon is mounted upon a table 15. The upper end of the support 10 has a slot 16 formed therein in which a concave roller 17 is rotatably mounted by means of a pair of apertured lugs, one of which is shown in Fig. 2 and designated 18. The guides 11 and 12 have openings 19 and 20, respectively, formed therein which are vertically aligned and of slightly larger diameter than a cable 21 which may pass therethrough.

An insulating block 22 (Fig. 1), attached to the base member 13, has identical steel blocks 25—25 and 26—26 secured thereto by screws 24—24 which hold the several elements together. A terminal holder 27 made of insulating material is secured to the block 22 by means of screws 28—28 and separates the blocks 25—25 from the blocks 26—26. Copper electrode holders 29, 30, 31 and 32, having dove-tailed grooves 35—35 formed therein, are slidably mounted upon dove-tailed guides 36—36 formed upon the blocks 25—25 and 26—26. The electrode holders also are provided with slots 39—39 which terminate in bores 40—40 extending longitudinally through the holders. The diameters of the bores 40—40 are the same as those of carbon electrodes 45, 46, 47 and 49 inserted in the bores. Bolts 50—50 screwed into threaded apertures formed in the bottom portions of the electrode holders and passing loosely through apertures in those portions of the electrode holders above the slots 39—39 force the upper portions of the electrode holders toward the lower portions thereof to firmly clamp the electrodes in the bores 40—40.

Since the principle of operation of all the electrode holders is identical, only one electrode holder will be described in detail. A spring 55 having one end thereof attached to a pin 56 projecting from the electrode holder 29 and the other end thereof attached to a pin 57 secured to the block 25 tends to slide the electrode holder 29 to the left, as viewed in Fig. 2.

A lever 59 (Fig. 1), having a cam surface 60 and a projection 61 formed thereon, is pivotally mounted on a pin 62 projecting from the block 25. When the lever 59 is swung outwardly, as viewed in Fig. 1, the cam surface 60 presses against a pin 65 secured to the lower part of the electrode holder 29 and slides the electrode holder along the guide 36 against the action of the spring 55. When the lever 59 is swung outwardly off-center, the pin 65, by the action of the spring 55, pushes against the surface 60 and forces the projection 61 against the side of the electrode holder 29, thus locking the electrode holder in open position. When it is desired to place the electrode 45 into its operative position, the lever 59 is swung in a counter-clockwise direction, as viewed in Fig. 1, so that the cam surface 60 is swung away from the pin 65, whereupon the spring 55 slides the electrode holder 29 toward the left, as viewed in Fig. 2.

The terminal holder 27 (Fig. 3) has a pair of sockets 67—67 formed therein having a configuration like that of one end of terminals 71—71, which are to be secured to the conductors of the cable 21, and these sockets form rigid seats for the terminals. The terminals 71—71 comprise cup-like portions 72—72 and flat tips 73—73 and fit in the sockets 67—67 with the tips extending downwardly. The sockets 67—67 are not so deep as the terminals 71—71 are long, and a portion of each terminal projects above the socket in which it is positioned. The sockets 67—67 are so positioned that the distance between the axes of the cups 72—72 of the terminals 71—71 positioned therein is substantially equal to the normal distance between the axes of the conductors to which the terminals are to be soldered.

A transformer 74 (Fig. 2) is connected to a suitable source of primary current and provides current of the desired voltage in the soldering circuit, which comprises a switch 76, which is preferably foot-operated, and a conductor 77 connected to one terminal of the switch and to the lower end of a terminal post 78 passing through an insulating bushing 79 positioned in an aperture in the table 15. Insulated conductors 80 and 81 are fastened to the upper end of the terminal post 78 and are secured to the electrode holders 30 and 32 by the corresponding bolts 50—50. Insulated conductors 82 and 85 are secured at one end of each to a terminal post 86, which is insulated similarly to the post 78, and is electrically connected to the transformer 74 by a conductor 87. The other ends of the conductors 82 and 85 are fastened to the corresponding bolts 50—50 secured to the electrode holders 29 and 31.

In the operation of the above described soldering fixture, one end of the cable 21 (Fig. 1), having a portion of an outer protecting jacket 89 removed and portions of individual insulating coverings 90—90 removed from conductors 91—91, is drawn over the roller 17 and passed through the aligned openings 19 and 20 in the guides 11 and 12. The end of the cable may then be released and will be retained in that position by the friction between the cable and the edges of the openings 19 and 20.

One of the terminals 71—71 is placed in one of the sockets 67—67, for example, the one adjacent to the electrode holders 31 and 32. During the above described steps, all the electrode holders are in the open position as illustrated by the electrode holders 29 and 30 in Fig. 1. After the terminal has been so positioned, the lever 59—59 associated with the electrode holders 31 and 32 are pivoted to their closed positions, as illustrated in Fig. 1, and the springs 55—55 force the electrode holders into such a position that the electrodes 47 and 49 engage the terminal.

The switch 76 is then closed and proper amounts of solder 102 and flux are placed in the cup 72 of the terminal. The current from the transformer 74 flows through the switch 76, the conductor 77, the terminal post 78, the conductor 81, the electrode 49, the terminal 71, the electrode 47, the conductor 85, the terminal post 86, and thence back to the transformer 74. The current passing through the terminal heats it and melts solder 102 therein.

Figures 3, 4:
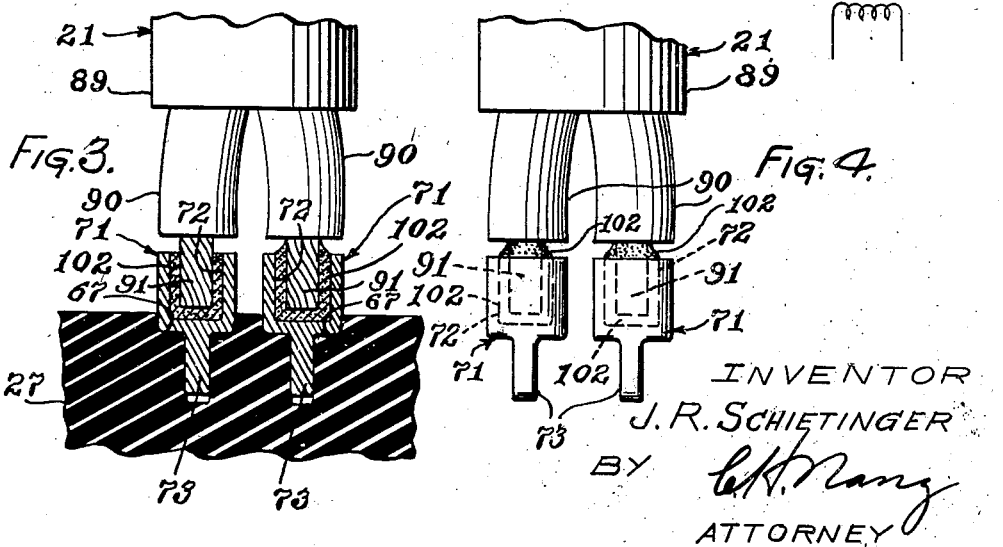
Fig. 3 is a fragmentary sectional view of a portion of the fixture and articles being joined therein.
Fig. 4 is a fragmentary view of articles soldered in the fixture.

The cable 21 is then drawn further through the apertures 19 and 20, and one of the conductors 91—91 is placed in the cup of the heated terminal and is aligned with the axis of the cup. A small space is left between the end of the covering 90 and the top of the cup 72, as shown in Fig. 3. The conductor is held rigidly in place by the fixture during the soldering operation. The current is left on for a sufficient period to permit the solder to fill the interstices between the strands of the conductor, additional solder being added, if needed, to fill the cup 72. The switch 76 is then opened and the solder 102 solidifies around the conductor without any relative movement between the terminal and the conductor. After the solder solidfies, the electrodes 47 and 49 are withdrawn from contact with the terminal and the parts are allowed to cool.

These operations are repeated to solder a terminal on the other one of the conductors 91—91. After the terminals have cooled sufficiently, the cable 21, with the terminals securely soldered thereon, is removed from the fixture.

The fixture embodying the invention hereinabove described permits the soldering of articles, such as terminals and conductors, with a great economy of time and effort and with a corresponding increase in the quality of products soldered thereby. There is no relative movement between the conductors and the terminals soldered thereto during the freezing of the solder and, in consequence, good joints result. At the same time, the operator is not subject to the tedium and effort of holding the cable motionless or of moving the cable while the soldering operation is being performed.

What is claimed is:

1. A fixture for soldering terminals to cables, comprising a pair of sockets for holding terminals to be attached to a cable, means for securing the end of a cable so that the conductors therein are in alignment with terminals positioned in the sockets, two pairs of individually movable carbon electrodes designed for selective engagement with the terminals to heat them, and means for energizing and deenergizing the electrodes.

2. A fixture for soldering terminals to conductors, which comprises a block having a socket formed therein for holding a terminal, a plurality of carbon electrodes, means for moving the electrodes individually into and out of contact with a terminal held in said socket, a foot-controlled switch for energizing and de-energizing said electrodes to heat said terminal, a support, guides secured to the support having aligned apertures therein, and a roller rotatably mounted on said support over which a conductor may be drawn and passed through said apertures and be thereby held against movement during the soldering operation.

3. A fixture for soldering terminals to cables, which comprises a support having guide arms projecting therefrom, said arms having aligned apertures therein for holding a cable, a roller mounted on said support for supporting a cable held in said apertures, a block having sockets formed therein below the arms for holding terminals to be attached to conductors of the cable held by said arms, electrode holders slidably mounted with respect to said terminals, a plurality of electrodes carried by the electrode holders, means for moving the electrode holders individually toward or away from said terminals to carry the electrodes into and out of contact with the terminals, and a foot-controlled switch for energizing and de-energizing said electrodes to heat the terminals engaged thereby.

JAMES R. SCHIETINGER.